United States Patent
Kang et al.

(10) Patent No.: US 8,843,996 B2
(45) Date of Patent: Sep. 23, 2014

(54) STORAGE DEVICE, AND AUTHENTICATION METHOD AND AUTHENTICATION DEVICE OF STORAGE DEVICE

(75) Inventors: Bo-Gyeong Kang, Gyeonggi-do (KR); Byung-Rae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 44 days.

(21) Appl. No.: 13/285,646

(22) Filed: Oct. 31, 2011

(65) Prior Publication Data

US 2012/0110639 A1    May 3, 2012

(30) Foreign Application Priority Data

Oct. 29, 2010   (KR) .................. 10-2010-0107317

(51) Int. Cl.
- G06F 7/04   (2006.01)
- G06F 17/30  (2006.01)
- G06F 21/44  (2013.01)
- G06F 21/78  (2013.01)

(52) U.S. Cl.
CPC ............... *G06F 21/44* (2013.01); *G06F 21/78* (2013.01)
USPC ............................................................ 726/2

(58) Field of Classification Search
USPC ............................................................ 726/2
See application file for complete search history.

(56) References Cited

U.S. PATENT DOCUMENTS

| | | | |
|---|---|---|---|
| 2001/0029583 A1* | 10/2001 | Palatov et al. | 713/193 |
| 2004/0243821 A1 | 12/2004 | Kim et al. | |
| 2005/0251690 A1 | 11/2005 | Kuno et al. | |
| 2008/0163364 A1* | 7/2008 | Ferlitsch | 726/21 |
| 2008/0168534 A1* | 7/2008 | Takamizawa et al. | 726/2 |
| 2009/0132833 A1* | 5/2009 | Jin | 713/193 |
| 2009/0240957 A1 | 9/2009 | Sano | |

FOREIGN PATENT DOCUMENTS

| | | |
|---|---|---|
| KR | 1020030070450 | 8/2003 |
| KR | 1020060046678 | 5/2006 |
| KR | 1020090075430 | 7/2009 |

* cited by examiner

*Primary Examiner* — Kambiz Zand
*Assistant Examiner* — Stephen Sanders
(74) *Attorney, Agent, or Firm* — The Farrell Law Firm, P.C.

(57) ABSTRACT

An authentication method of a storage device includes requesting an EID (Encoded IDentifer) to the storage device by an authentication device for authenticating the storage device, receiving the EID by the authentication device, restoring original ID information by decoding the received EID, and verifying individual ID information corresponding to use of the storage device included in ID information by using ID authentication information received from the storage device, wherein the ID information includes multiple pieces of individual ID information corresponding to the use of the storage device.

17 Claims, 3 Drawing Sheets

STORAGE DEVICE, AND AUTHENTICATION METHOD AND AUTHENTICATION DEVICE OF STORAGE DEVICE

PRIORITY

This application claims priority under 35 U.S.C. §119(a) to a patent application filed in the Korean Industrial Property Office on Oct. 29, 2010 and assigned Serial No. 10-2010-0107317, the content of which is incorporated herein by reference.

BACKGROUND OF THE INVENTION

1. Field of the Invention

The present invention relates generally to a non-volatile storage device, and more particularly, to an authentication method and an authentication device of the non-volatile storage device.

2. Description of the Related Art

In DRM (Digital Rights Management) technology, CPRM (Content Protection for Recordable Media) technology for an SD (Secure Digital) card, and an AACS (Advanced Access Content System) technology for a blue-ray disc, authentication of a storage device is performed by using a cryptographic technology such as a PKI (Public Key Infrastructure).

A storage device uses a specific identifier regardless of the use for its own security. When a storage device is deemed as an inappropriate storage medium by an authentication process as described above, a corresponding storage device is discarded through a separate process.

In a device authentication method of a CPRM technology for an SD card, and an AACS technology for a blu-ray disc, an identifier is stored at a position appointed as a read-only area when the storage medium is produced, and a cryptographic scheme is employed for device authentication and content protection. However, after the production, if the identifier is discarded due to any illegal use of the storage device, the storage device (i.e., SD card, Blue-ray disk) may no longer be used for any purpose.

Accordingly, there is a need in the art for a method for providing identifiers according to various uses of a storage device.

SUMMARY OF THE INVENTION

Accordingly, an aspect of the present invention is to solve the above-stated problems occurring in the prior art, and to provide a storage device, and an authentication method and an authentication device of the storage device, in which identifiers are provided according to uses of the storage device so that authentication can be individually performed for each identifier.

In accordance with the present invention, there is provided an authentication method of a storage device, including requesting an EID (Encoded IDentifier) to the storage device by an authentication device for authenticating the storage device, receiving the EID from the storage device by the authentication device in accordance with the request, restoring original ID information by decoding the received EID, and verifying individual ID information corresponding to use of the storage device included in ID information by using ID authentication information received from the storage device, wherein the ID information includes multiple pieces of individual ID information corresponding to the use of the storage device.

In accordance with the present invention, there is provided an authentication device for authenticating a storage device, the authentication device including an ID decoder for requesting an EID to the storage device, receiving the EID from the storage device in accordance with the request, and restoring original ID information by decoding the received EID, and an authenticator for verifying individual ID information corresponding to use of the storage device included in ID information by using ID authentication information received from the storage device, wherein the ID information includes multiple pieces of individual ID information corresponding to the use of the storage device.

In accordance with the present invention, there is provided a storage device including an EID area which is positioned at a particular area of the storage device, and stores an EID for specifically identifying the storage device, and ID authentication information including information for verifying ID information, wherein the ID information includes multiple pieces of individual ID information corresponding to use of the storage device.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, a device and an operation of the present invention will be described in detail with reference to the accompanying drawings. In the following description, specific details such as configuration elements are set forth in order to provide a thorough understanding of the present invention. It will be apparent to those skilled in the art that various changes and modifications can be made without departing from the spirit of the present invention. Also, well known technologies will not be described in detail herein for the sake of clarity and conciseness.

The present invention discloses an individual authentication method and a device thereof according to the use of a non-volatile storage device, which can improve the applicability of the storage device. To this end, the storage device of the present invention includes a plurality of IDs corresponding to respective functions of the storage device at a specific area, in which the IDs are encoded. When the storage device is used, the authentication device for authenticating the storage device restores an original ID by using an ID decoder, and performs an authentication by verifying an ID corresponding to the use. When the authentication of a storage device fails due to a particular illegal use of the storage device, only an ID corresponding to the particular illegal use of the ID is discarded so as to inhibit the illegal use. Accordingly, the storage device may be continuously utilized for other purposes.

Figure 1:
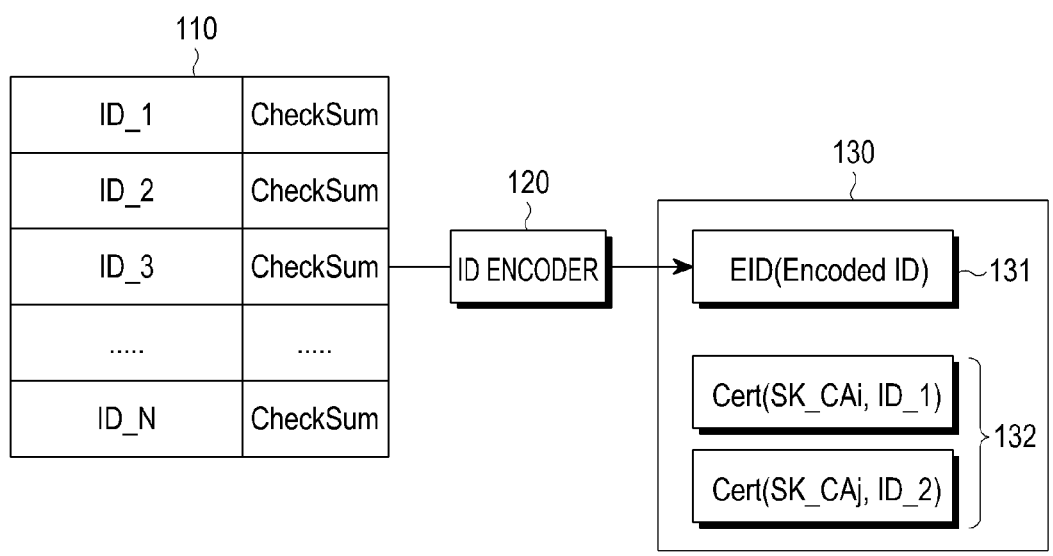
FIG. 1 illustrates the structure of an identifier, and the configuration of a storage device, according to the present invention.

FIG. 1 illustrates the structure of an identifier, and the configuration of a storage device, according to the present invention.

In FIG. 1, an ID 110 for identifying a storage device 130 includes a plurality of individual IDs (ID_i) and checksums. The individual IDs (ID_i) of the identifier are used to identify respective uses of the storage device. The storage device may be used for various purposes, such as private information storage, data storage using a document encryption technology such as DRM, certificate information storage and content storage. Individual IDs may be generated according to each use.

Referring to FIG. 1, an ID encoder 120 generates an EID by using the ID 110 for identifying the storage device 130.

The storage device 130 includes the EID 131 and certificates 132 corresponding to the respective individual IDs of the ID 110. The certificates 132 correspond to information used to verify the suitability of the ID restored by the authentication device authenticating the storage device.

The ID 110 for identifying the storage device 130 is encoded and converted into the EID 131 through the ID encoder 120 in the generation step or the test step of the storage device 130, and the EID 131 is programmed into the storage device 130. During recording or reproducing of the storage device 130, a host device performing the recording or the reproducing performs authentication of the storage device by using the EID.

Figure 2:
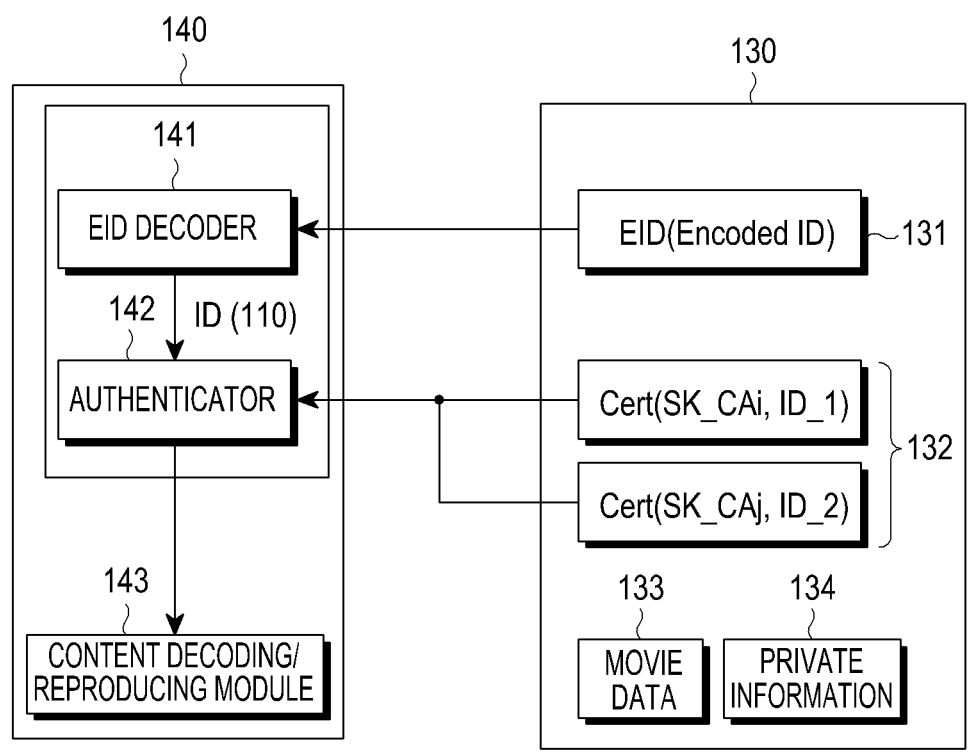
FIG. 2 illustrates the configuration of an authentication device performing authentication of a storage device, according to the present invention.

FIG. 2 illustrates the configuration of an authentication device performing authentication of a storage device, according to the present invention.

Referring to FIG. 2, the storage device 130 includes the EID 131 for storing encoded ID information, and a plurality of certificates 132 for verifying individual IDs, and may store data such as image contents 133 such as movies, and private information 134. The storage device 130 further includes a controller (not shown) for controlling input/output of the storage device, and reading/writing. The controller controls the EID and the ID authentication information to be transferred to an authentication device, for authenticating the storage device.

In FIG. 2, an authentication device (host device) 140 for authenticating the storage device 130 includes an EID decoder 141, an authenticator 142, and a content decoding/reproducing module 143.

The EID decoder 141 receives an EID from the storage device 130 and restores an original ID from the EID.

The authenticator 142 receives the ID of the storage device 130 output from the EID decoder 141, and performs authentication of the storage device by performing cryptographic verification. The authentication device 140, that is, the host device, in accordance with the use of the storage device to be used by the host device, determines the legality of the storage device 130 by using an individual ID_i and a certificate 132 of a corresponding storage device.

When an individual ID is determined to be legal by the authenticator 142, the content decoding/reproducing module 143 generates a content decoding key by using the value of the individual ID, and performs content reproduction by decoding contents.

During authentication of the storage device 130, the EID decoder 141 receives an EID from the EID area 131 of the storage device 130, and the authenticator 142 receives a certificate 132 from the storage device.

In order to verify an individual ID of the storage device 130, a Public Key Infrastructure (PKI) using a certificate 132 is used. However, the present invention is not limited thereto. If a broadcast key management is used, a set of keys capable of key management according to respective uses may be provided instead of the certificate 132. Also, the PKI scheme may be used in combination with a Broadcast Key Management technique. In this case, the storage device 130 may include both a certificate and a set of keys capable of key management.

Figure 3:
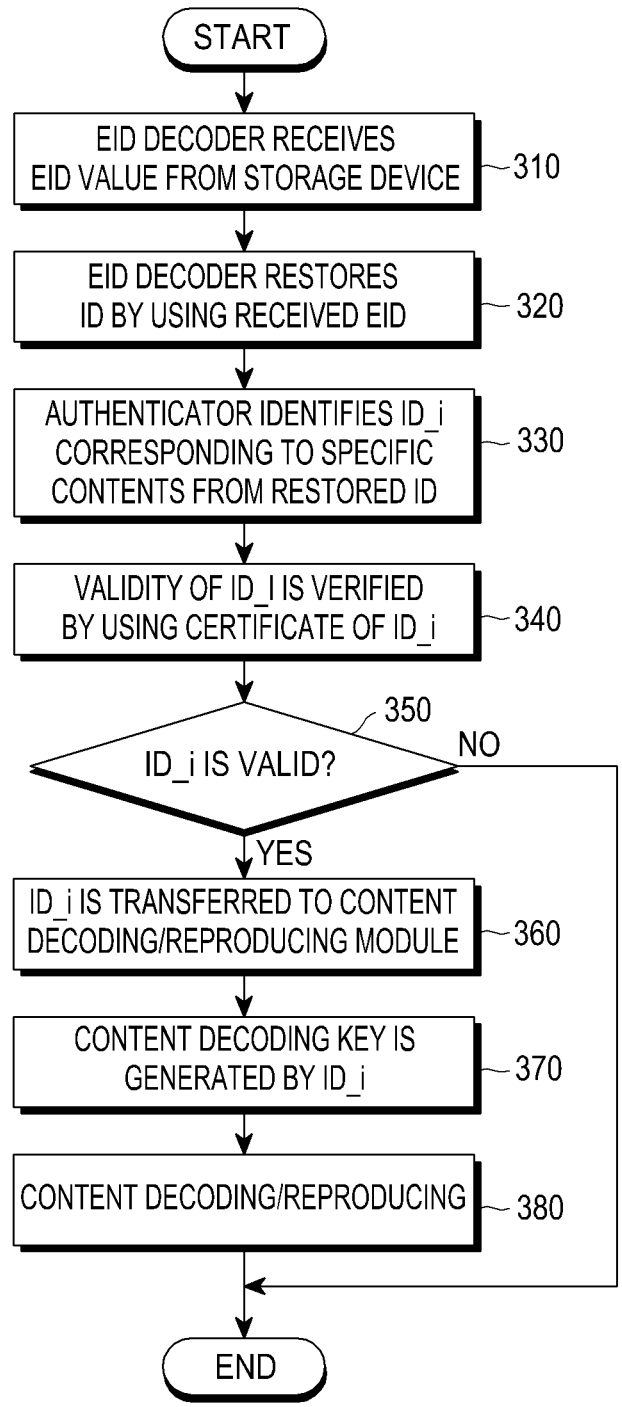
FIG. 3 illustrates an authentication process of a storage device, according to the present invention.

FIG. 3 illustrates an authentication process of a storage device, according to the present invention.

Referring to FIG. 3, when the host device for performing recording or reproduction of the storage device 130 receives an access request on specific contents of the storage device 130, the authentication device 140 for authenticating the storage device 130 included in the host device makes a request for an EID to the storage device 130 through the EID decoder 141 in step 310, and receives an EID from the storage device 130 according to the request.

The ID decoder 141 may be set to receive only an encoded individual ID ID_i corresponding to the use of the storage device 130, from among EIDs, from the storage device 130 in accordance with the use of the storage device 130. Specifically, when making a request for an EID to the storage device 130, the ID decoder 141 transfers information on the use of the storage device 130.

Based on the information, on the use of the storage device according to controller's control, the storage device 130 extracts only an encoded individual ID corresponding to the use from the EID 131, and transfers the extracted encoded individual ID to the ID decoder 141.

The ID decoder 141 may be set to receive all of EIDs of the storage device 130 in step 310, and to use only an individual ID corresponding to the use of the storage device 130 in a later step.

In step 320, the EID decoder 141 restores an original ID by using the received EID.

In step 330, the authenticator 142 identifies an individual ID_i corresponding to the use (specific contents) of the storage device from the restored ID. The authenticator 142 receives the certificate 132 corresponding to the individual ID from the storage device.

In step 340, the authenticator 142 verifies the validity of the individual ID ID_i by using the certificate 132. In this validity verification, an algorithm 1 below may be used, as follows.

$$\text{Hash}(ID\_i) = ? \text{checksum} \qquad \text{algorithm 1}$$

In step 350, it is determined whether the validity of an individual ID has been verified. When the individual ID has been determined to be illegal, the process is ended. The host device may stop the reproduction of contents, and may connect to a predetermined License Authority Site and make a request for discarding of the use of the corresponding storage device 130 to the connected site by transmitting the reason for the discard.

In step 350, when the individual ID has been determined to be legal, the process proceeds to step 360, in which the content decoding/reproducing module 143 is paged and the individual ID ID_i is transferred to the content decoding/reproducing module 143.

In step 370, when the verified individual ID is defined as an ID for image data, the content decoding/reproducing module 143 generates a content decoding key by using the individual ID. Herein, the content decoding key may be generated by using algorithm 2 as defined below.

$$\text{Hash}(ID\_i, \text{Decryption Key}) = \text{ContentsDecryptionKey} \qquad \text{algorithm 2}$$

In step 380, contents are decoded and reproduced.

In the present invention, various identifiers are provided according to uses of the storage device, and each identifier is individually authenticated. Accordingly, when authentication on an identifier for a specific use of the storage device fails, it is possible to individually discard only the function of the authentication-failed specific use, instead of the entire storage device. Accordingly, even though a function for a specific use of the storage device is discarded, the storage device can be continuously utilized for other uses, thereby improving the applicability of the storage device. Also, the storage device of the present invention can perform an authentication process on various identifiers by using the same authentication device (ID decoder) in the same manner.

While the present invention has been described in detail, the embodiments in the description of the present invention are merely an example and the present invention is not limited thereto. It will be understood by those skilled in the art that various changes in form and details may be made therein without departing from the spirit and scope of the invention as defined by the appended claims.

What is claimed is:

1. A method for authenticating a storage device by a host device, the method comprising:
   reading, by a host device, an encoded individual identifier (ID) from the storage device which stores a plurality of encoded individual IDs;
   decoding, by a host device, the encoded individual ID;
   receiving, by a host device, authentication information corresponding to the decoded individual ID from the storage device; and
   verifying, by a host device, the authentication information using the decoded individual ID.

2. A host device for authenticating a storage device, the host device comprising:
   an ID decoder for reading an encoded individual identifier (ID) from the storage device which stores a plurality of encoded individual IDs and decoding the encoded individual ID; and
   an authenticator for receiving authentication information corresponding to the decoded individual ID from the storage device, and verifying the authentication information using the decoded individual ID.

3. A storage device comprising:
   an Encoded Identifer (EID) area storing a plurality of encoded individual IDs; and
   a controller configured to send an encoded individual ID from among the plurality of encoded individual IDs to a host device and send authentication information corresponding to the encoded individual ID to the host device,
   wherein the authentication information is generated by encrypting the individual ID with an encryption algorithm.

4. The authentication method of claim 1, wherein the plurality of encoded individual IDs correspond to a plurality of applications.

5. The authentication method of claim 4, wherein the plurality of applications are related to at least two of use of content, use of private information, use of encryption data and use of certificate information.

6. The authentication method of claim 4, wherein the host device receives a request to access the storage device, and the access requested requires at least one specific use of the storage device.

7. The host device of claim 2, wherein the plurality of encoded individual IDs correspond to a plurality of applications.

8. The host device of claim 7, wherein the plurality of encoded individual IDs are requested and received from the storage device, and at least one of the plurality of encoded individual IDs is restored and verified.

9. The host device of claim 7, wherein the plurality of applications are related to at least two of use of content, use of private information, use of encryption data and use of certificate information.

10. The storage device of claim 3, wherein the plurality of encoded individual IDs correspond to a plurality of applications.

11. The storage device of claim 10, wherein the plurality of applications are related to at least two of use of content, use of private information, use of encryption data and use of certificate information.

12. The authentication method of claim 1, wherein the authentication information is verified using verification data generated by encrypting the decoded individual ID with an encryption algorithm.

13. The authentication method of claim 1, wherein the authentication information is verified by comparing the authentication information with verification data generated by encrypting the decoded individual ID with an encryption algorithm.

14. The authentication method of claim 1, further comprising aborting the authentication of the storage device when the verification fails.

15. The host device of claim 2, wherein the authentication information is verified using verification data generated by encrypting the decoded individual ID with an encryption algorithm.

16. The host device of claim 2, wherein the authentication information is verified by comparing the authentication information with verification data generated by encrypting the decoded individual ID with an encryption algorithm.

17. The host device of claim 2, wherein the authenticator aborts the authentication of the storage device when the verification fails.

* * * * *